(No Model.) 4 Sheets—Sheet 2.
H. A. KEPHART.
PORTABLE KNOCKDOWN BOOTH.
No. 589,971. Patented Sept. 14, 1897.
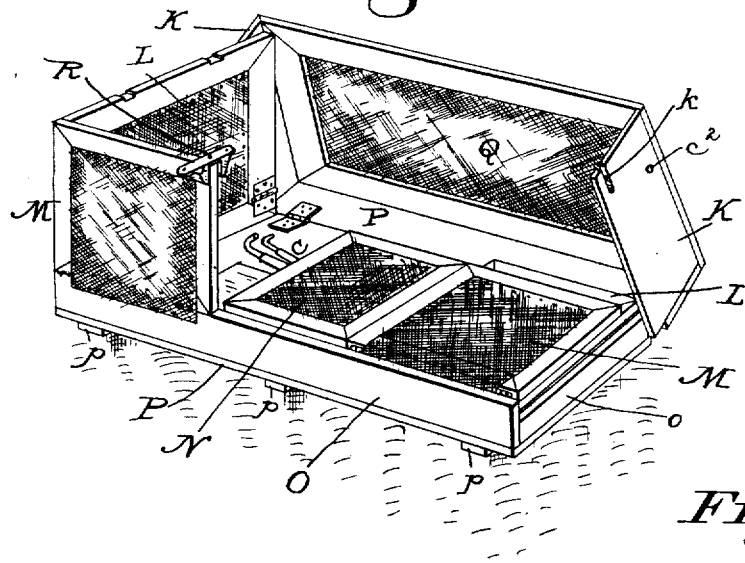
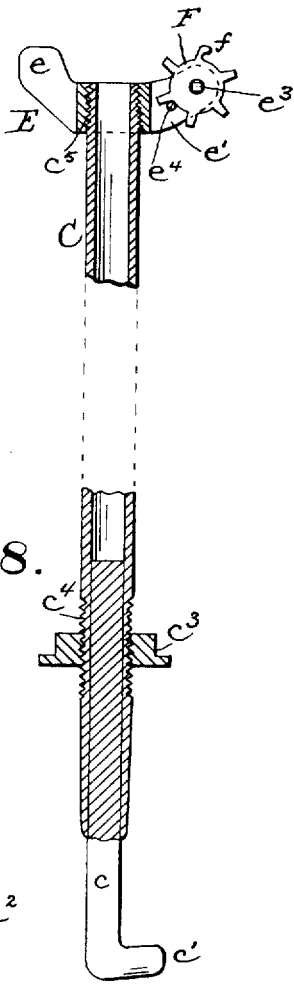
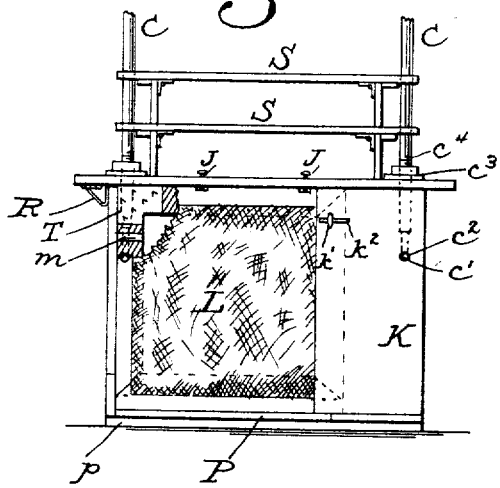
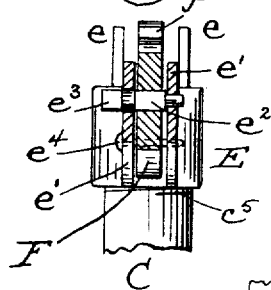
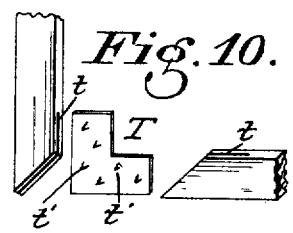
WITNESSES:
John H. Julian
James Knight
INVENTOR:
Henry A. Kephart,
BY
Frank M. Burnham.
ATTORNEY (No Model.) 4 Sheets—Sheet 3.

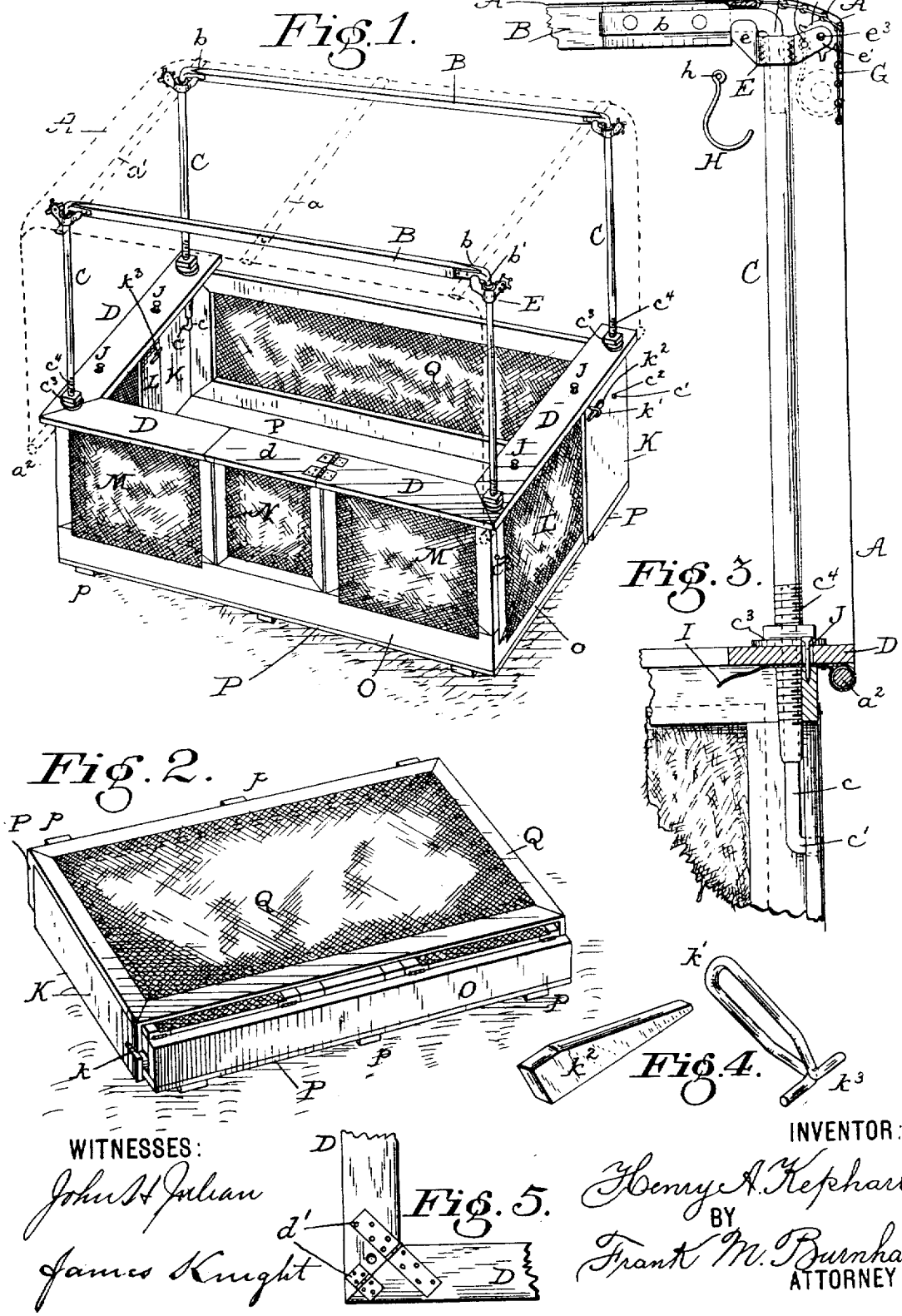

H. A. KEPHART.
PORTABLE KNOCKDOWN BOOTH.

No. 589,971. Patented Sept. 14, 1897.

WITNESSES:
John H. Julian
James Knight

INVENTOR:
Henry A. Kephart,
BY Frank M. Burnham,
ATTORNEY (No Model.) 4 Sheets—Sheet 4.

H. A. KEPHART.
PORTABLE KNOCKDOWN BOOTH.

No. 589,971. Patented Sept. 14, 1897.

WITNESSES:
John H. Julian
James Knight

INVENTOR
Henry A. Kephart,
BY Frank M. Burnham,
ATTORNEY

UNITED STATES PATENT OFFICE.

HENRY ADAM KEPHART, OF TROY, OHIO.

PORTABLE KNOCKDOWN BOOTH.

SPECIFICATION forming part of Letters Patent No. 589,971, dated September 14, 1897.

Application filed December 21, 1896. Serial No. 616,511. (No model.)

*To all whom it may concern:*

Be it known that I, HENRY ADAM KEPHART, a citizen of the United States, residing at Troy, in the county of Miami and State of Ohio, have invented certain new and useful Improvements in Portable Knockdown Booths; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in that class of light portable structures known as "booths," and although designed more especially to afford protection to gardeners, hucksters, and other venders in cities where the markets are held in the open streets and the occupants and their wares exposed to the weather it may also be used with advantage by venders and fakirs at fairs, or excursionists and picnickers or other persons camping out.

The principal objects of this invention are, first, to provide a light portable knockdown structure which affords complete protection from the weather; second, one which may easily and quickly be set up and taken down; third, means whereby it may be readily disposed of out of the way while being transported by attaching it underneath the wagon or vehicle; fourth, its small cost of manufacture.

Figure 12:
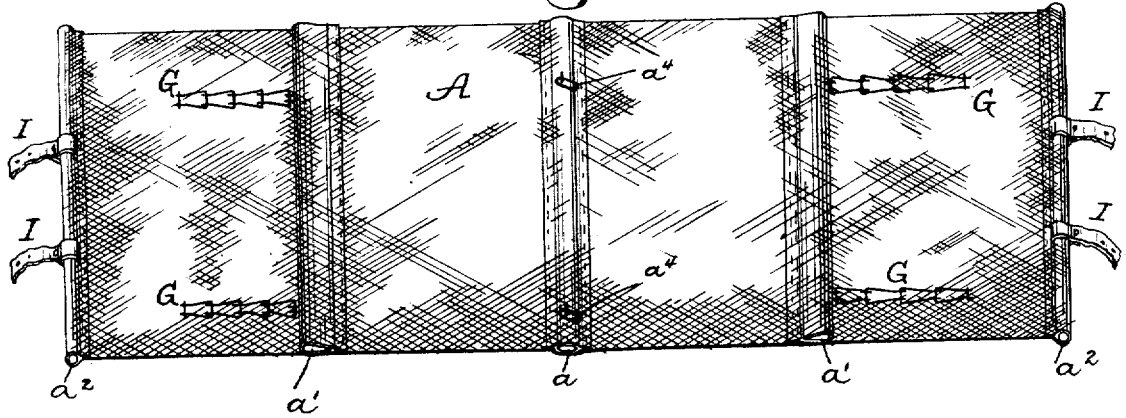
Figure 13:
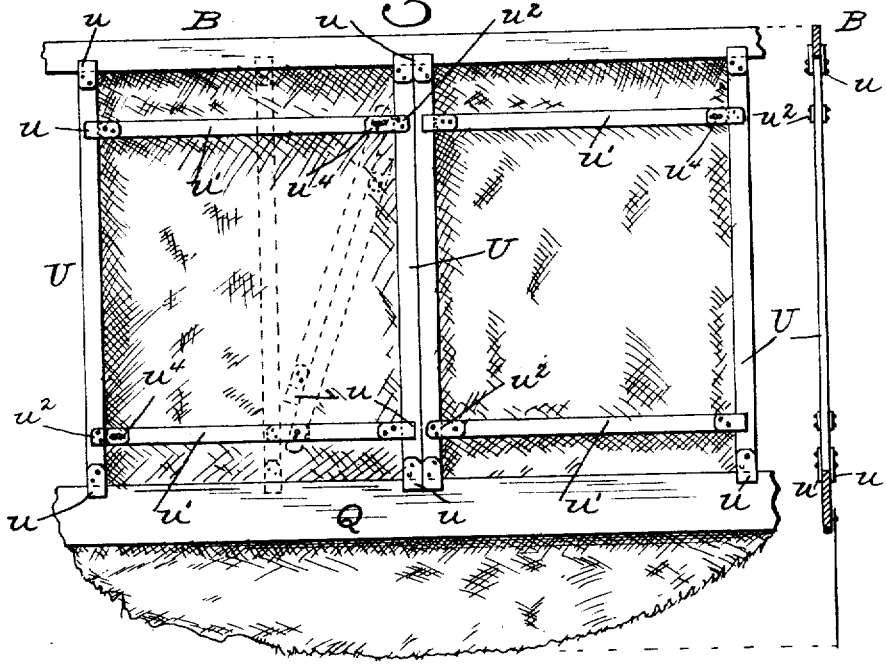
Figure 14:
Figure 15:
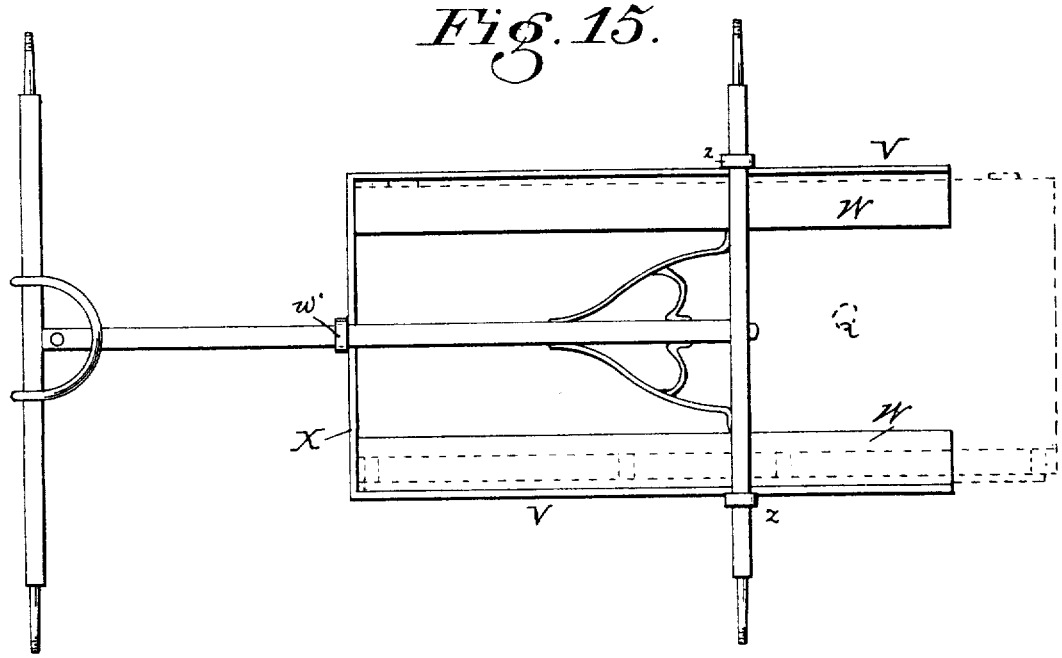
Figure 16:
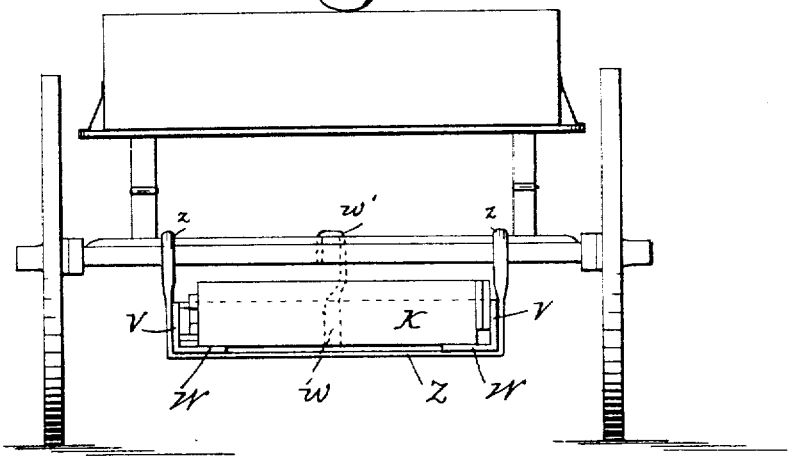

In the accompanying drawings, illustrating my invention, and in which similar letters of reference indicate like parts in all the several views, Figure 1 is a perspective view of my booth with curtain or canopy located by dotted lines. Fig. 2 is a perspective view of booth when knocked down or closed. Fig. 3 is an enlarged side view of one of the tubular standards, sprocket-wheel, and chain for curtain in position and attached to corner of booth. Fig. 4 is a detail view of one of the staples and pins for securing end panels. Fig. 5 is a detail view of corner of counter, showing hinges for folding same. Fig. 6 is a perspective view of booth partially folded. Fig. 7 is an end view of booth with upper portion of standards broken off and curtain removed. Fig. 8 is a sectional view of one of the standards. Fig. 9 is end view of collar with sprocket-wheel partially in section. Fig. 10 is a detail view of portion of frame and metal angle for mitering same. Fig. 11 is a detail view of counter-supporting bracket. Fig. 12 is a view of curtain or canopy. Fig. 13 is a view of form of curtain which may be used for front or rear of booth. Fig. 14 is a detail view of link and hook for securing the center slat of curtain to horizontal rafters. Fig. 15 is a plan view of tray or carriage which supports the booth beneath the vehicle when folded and being transported. Fig. 16 is an end view of wagon, showing tray containing booth suspended from axle and perch beneath during transportation.

A is a strong waterproof canvas curtain or canopy which extends over the entire top and down the ends of the booth to the counter D and is provided with any suitable number of slats, the center slat $a$ being of oval shape and provided near each end with link $a'$, which engages small hook $b^2$ on horizontal rafters B and thus holds down curtain A on each side of said rafters, while the slats $a'$ at each end of the top being perfectly flat on top and bottom and curved at their outer edges or sides (see Figs. 3 and 12) for the purpose of holding the said curtain A more firmly in position and allow of its being drawn taut, while at each end, instead of a slat, a small roller $a^2$ is employed, so as to readily roll up the curtain. (See Figs. 3 and 12.)

B are two horizontal rafters, one on each side of booth, extending longitudinally thereof, so as to support the curtain A, and are in turn supported at each of the four corners of the booth by the bifurcated or V-shaped extension $b$, riveted thereto and formed with lugs or legs $b'$, which rest in hollow upright or vertical supports or standards C, said standards C being tubular and at a short distance of their lower ends terminate in legs $c$, to which they are welded or made integral therewith, and are formed with a foot $c'$, so as to fit in openings $c^2$, which, in connection with nut and washer $c^3$, (said nut and washer may be integral or separate,) being screwed over the screw-threaded portion $c^4$ down to the counter D, firmly holds the vertical supporting-standards C in an upright or vertical position, thus making a strong solid structure.

The upper ends of each of the four upright standards C are screw-threaded at $c^5$ to receive the screw-threaded collar E, which is formed at its inner side with two slight lips $e$, between which rests the extension $b$ of the short legs $b'$.

The opposite or outer side of said collar E has ears $e'$, between which are journaled the axle $e^2$, carrying a small sprocket-wheel F, having all of its teeth of a straight ordinary shape with the exception of one tooth $f$, which is hook-shaped, so as to receive and engage the links of chain G, said chain being attached by small staples to slats $a'$ of curtain A, and by using a small wrench on the key-shaped end $e^3$ of the axle $e^2$ and placing a small pin $e^4$ through its corresponding opening in the ear $e'$ the curtain or canopy A can be drawn so firm and taut as to resist any action of the wind and easily shed the rain; or, if desired, instead of a sprocket-wheel any small pulley having the hook-shaped tooth $f$ and provided with opening to receive pin $e^4$ may be used, as I do not limit myself to the exact form of construction here shown.

The hook H rests against the ear $e'$, and by means of pin $e^4$, passing through eye $h$, affords a simple and handy support for end portions of curtain A when rolled up.

The four straps I are looped around and riveted two to each roller $a^2$ of said curtain A and pass through slotted and correspondingly-shaped openings in top of end panels (see Figs. 3 and 7) and are held in position by means of pins J, thus binding the end portions of curtain down under counter when so desired.

The rear ends of the booth have solid wooden panels K, connected at right angles at bottom and sides to floor P, and rear side panels Q, and are provided with small openings $c^2$ to receive foot $c'$ of leg $c$ of the upright standards C, and are further provided with a slot $k$ to receive staple $k'$, which latter receives a wedge-shaped pin $k^2$, said staple $k'$ being so formed at its other end $k^3$ that it connects said rear end panels K to frame of front end panels L, the latter being covered with suitable strong waterproof canvas and having opening $c^2$ for like purpose, as above described. Said panels L are connected at upper forward corner to front panel M by a dowel-pin $m$.

Front panels M are located one at each end of the booth and are formed with a frame, to which is tacked strong waterproof canvas, and are provided with dowel-pins $m$, which connect them to end panels L, as above described, and have located between them the door N, which also consists of a strong frame having tacked thereto a strong waterproof canvas, and affords entrance and egress to and from the interior of the booth.

O and $o$ are front and end sills, respectively, to which are hinged on the inside the front and end panels, respectively, M M L L.

The floor P is raised from the ground by cleats $p$, thus always affording a dry comfortable interior for the occupant, and is provided with hinges at its rear, near where it is rigidly connected to rear side panel Q, so that when the booth is knocked down and entirely closed, as shown in Fig. 2, rear panel Q forms the top, wooden panels K form the ends, part of floor P forms rear edge or side, while sill O forms front edge or side.

R is a small metal bracket placed over the top of the frame of front panel M at left of door N, so when said door is opened it will form a firm support or rest for counter D. (See Figs. 6 and 11.)

Counter D is formed in two sections, one of which is provided with a door $d$, which, in connection with door N, forms the entrance or outlet to interior of booth, and these two sections together form a substantial counter extending along each end from the rear and around the front and have hinges $d'$ at each corner, as shown in Fig. 5, so as to fold up, to be placed inside of booth when transported. The strap-pins J pass through the counter D, as above referred to, and engage straps I, so as to securely hold down curtain A. Legs $c$ of tubular standards C pass through counter D at the four corners of the booth and by means of nut and washer $c^3$ and foot $c'$ hold said counter D in position, as previously described.

When it is desired to use a curtain for front or back side of booth, I prefer to use a form illustrated in Fig. 13, which I consider a very important feature of this invention. I preferably make it in two sections where designed to cover a space more oblong than rectangular, and may be used for various other structures than booths. Each section is composed of two upright or vertical strips or pieces U, formed by means of short tips or extensions into bifurcated ends $u$, so as to be slid or moved along the bottom of horizontal rafter B and top of frame of rear side panel Q and in connection with upper and lower horizontal brace-bars $u'$, the metal extensions at one end being rigidly attached at $u^2$ to one of the upright strips U, while the end of said horizontal brace-bar $u'$ has a pivotal and slotted connection $u^4$ and other end of horizontal brace $u'$ having the bifurcated end $u$ same as upright U, so that when the two vertical pieces U are brought toward each other the horizontal braces $u'$ will fold between, as shown by dotted lines, and thus open the back of booth by closing up the canvas curtain which covers it and is attached to vertical pieces U.

Shelves S may be used at either end of booth of any convenient form of construction, one style of which I have shown in Fig. 7, which may be folded up and placed inside of booth with all of the other detachable parts while being transported.

Door N and all panels, excepting wooden panels K, have strong waterproof canvas tacked to their frames on outsides, and for the purpose of keeping rain, snow, and all dampness out of booth hang down over all joints.

Another important feature of my improved booth consists in the mitered joints of all frames, which, as illustrated in Fig. 10, consists in having slots *l* cut in end of each frame-piece to be mitered, and into said slots *l* are placed a thin metallic L-shaped angle T, which has short sharp barbed teeth *l'* punched from either side thereof. Said metal angle T is first dipped in liquid glue, then slid lightly between slots *l* in ends of frame, which after being brought closely together are placed in a press, and by the action of glue, in conjunction with barbed teeth, when hard and set make a strong, cheap, and quickly-formed mitered joint, which may be used wherever needed.

In Figs. 15 and 16 I have shown a simple cheap form of carrier or tray in which the booth when folded, after being knocked down, Fig. 2, is suspended from and underneath the gearing of wagon or vehicle while being transported, and consists of side pieces V, narrow floor-strips W, and forward end piece X, which together form the body or tray proper. Forward end piece X has riveted or bolted to it a flat end *w* of hook *w'*. Said hook *w'* passes up over and grasps the perch of the vehicle. Flat metal strip Z passes underneath the tray and is riveted to side and floor pieces V V and W W and terminates at each end in hooks *z*, which pass over and grasp the axle of wagon or vehicle, thus forming a cheap and convenient carrier for the booth.

Having described my invention, what I claim, and desire to secure by Letters Patent, is—

1. In a booth or other knockdown structure; end panels K and L connected by detachable fastenings, front panels M, door N, rear panel Q, sills O and *o*, hinged floor P, cleats *p* all so hinged as to fold up completely, as shown and described.

2. In a curtain for windows or doors two vertical or upright strips, having both ends bifurcated so as to make bearings above and below capable of being moved or slid together or apart; and horizontal brace-bars for holding them apart, each horizontal brace-bar having a metal tip or extension which is riveted to vertical or upright strips and so pivoted and slotted as to work freely, and the other end thereof bifurcated so as to fold, when this end is disengaged and vertical or upright strips are moved together, substantially as set forth.

3. The combination with the canvas A; of a chain G, wheel or pulley F having hooked tooth *f*, and pin *e⁴* substantially as and for the purposes specified.

4. The tubular standards each terminating at their lower ends in a leg formed with a foot thereon; said legs screw-threaded to receive nut and washer for binding against the counter; and having their upper ends screw-threaded to receive a collar; and also provided with an opening in said upper end to receive legs *b'* of bifurcated extensions *b*, which support horizontal rafters riveted therein substantially as and for the purpose specified.

5. A collar formed on one side with lips *e*, other side formed with journal-bearings *e'* provided with openings adapted to receive axle of wheel or pulley F, said bearing also provided with an opening or eye to receive pin or stop *e⁴*, substantially as and for the purpose specified.

6. A tray or carrier for transporting a knockdown booth or any device underneath the vehicle; formed with side pieces, floor-strips, forward end piece, provided with hook to grasp over perch, hooks coming up from side pieces and passing over and grasping axle of vehicle; substantially as shown and described.

7. The combination in a knockdown booth or other structure of solid wooden end panels K having slot *k* and connected by a staple *k'*, having ends *k³* and pin *k²* or otherwise, to canvas end panels L; connected by doweling-pin *m* to canvas front panels M, metallic angle T for mitering joints or frames canvas door N, canvas rear panel Q, front sills O, end sills *o*, floor P, cleats *p*, counter D provided with hinges *d'* at corners and door *d;* shelves S; counter-receiving standards C formed with foot *c'* on leg *c*, screw-threads *c⁴* to receive nut and washer *c³;* screw-threads *c⁵* at top to receive collar E formed with lips *e* supporting horizontal rafters B by means of bifurcated extension *b* formed with leg *b'* resting inside top of tubular standards; having ears *e'* carrying wheel or pulley F formed with hooked tooth *f* on axle *e²* formed with keyed end *e³*, pin *e⁴* passing through pulley, and hook H with eye *h* curtain A having slat *a* and link *a⁴*, slats *a'*, rollers *a²*, straps I retained by pins J, chain or rope G to engage hooked tooth *f*, substantially as and for the purposes set forth and described.

In testimony whereof I affix my signature in presence of two witnesses.

HENRY ADAM KEPHART.

Witnesses:
 JAMES KNIGHT,
 F. E. SCOBEY.